United States Patent
Law

(10) Patent No.: US 10,517,230 B2
(45) Date of Patent: Dec. 31, 2019

(54) LAYERED FACADE PANEL

(71) Applicants: DESIGNLAW LIMITED, Brancaster, King's Lynn, Norfolk (GB); OVE ARUP PARTNERSHIP LIMITED, London (GB)

(72) Inventor: Alistair Law, King's Lynn (GB)

(73) Assignee: DESIGNLAW LIMITED, Brancaster, King's Lynn (GB)

( * ) Notice: Subject to any disclaimer, the term of this patent is extended or adjusted under 35 U.S.C. 154(b) by 34 days.

(21) Appl. No.: 15/038,017

(22) PCT Filed: Nov. 21, 2014

(86) PCT No.: PCT/GB2014/053447
§ 371 (c)(1),
(2) Date: May 19, 2016

(87) PCT Pub. No.: WO2015/075465
PCT Pub. Date: May 28, 2015

(65) Prior Publication Data
US 2016/0295807 A1 Oct. 13, 2016

(30) Foreign Application Priority Data
Nov. 21, 2013 (GB) .................. 1320584.4

(51) Int. Cl.
*A01G 9/02* (2018.01)
*A01G 25/00* (2006.01)

(52) U.S. Cl.
CPC ............. *A01G 9/025* (2013.01); *A01G 25/00* (2013.01); *Y02P 60/244* (2015.11)

(58) Field of Classification Search
CPC ........ A01G 9/022; A01G 9/023; A01G 1/007; A01G 9/025; A01G 1/005; A01G 31/06; A01G 31/02; Y02P 60/244
USPC ...... 47/82, 83, 62 R, 62 A, 62 N, 65.7, 65.9, 47/66.1, 66.5, 66.6, 66.7, 79
See application file for complete search history.

(56) References Cited

U.S. PATENT DOCUMENTS

| | | | |
|---|---|---|---|
| 2010/0083571 A1* | 4/2010 | Irwin | A01G 9/025 47/66.5 |
| 2011/0225883 A1 | 9/2011 | Clifford | |
| 2012/0227320 A1* | 9/2012 | Dos Santos | A01G 9/025 47/79 |

(Continued)

FOREIGN PATENT DOCUMENTS

| | | |
|---|---|---|
| CN | 202095320 U | 1/2012 |
| EP | 2 523 543 A1 | 11/2012 |

(Continued)

OTHER PUBLICATIONS

FR2860022 (machine translation).*

*Primary Examiner* — Trinh T Nguyen
(74) *Attorney, Agent, or Firm* — Craft Chu PLLC; Andrew W. Chu

(57) ABSTRACT

A layered façade panel for being secured to a building or structure. In one embodiment, the panel includes a porous metal outer layer, a non-porous backing layer and an intermediate layer between the outer and backing layers, the outer metal layer having a porosity for allowing vegetation to grow through and to be supported in pores in the outer layer, and the intermediate layer being for supporting roots of the vegetation.

18 Claims, 3 Drawing Sheets

(56) References Cited

U.S. PATENT DOCUMENTS

| | | | |
|---|---|---|---|
| 2015/0013223 A1* | 1/2015 | Rajagopalan | A01G 9/025 47/71 |
| 2015/0082698 A1* | 3/2015 | Yu | A01G 9/025 47/86 |
| 2015/0289452 A1* | 10/2015 | Axley | F28C 3/06 47/66.6 |

FOREIGN PATENT DOCUMENTS

| | | |
|---|---|---|
| FR | 2 860 022 A1 | 3/2005 |
| JP | 2002-136226 A | 5/2002 |
| JP | 2002-305961 A | 10/2002 |
| WO | 2012/000063 A1 | 1/2012 |

* cited by examiner

LAYERED FACADE PANEL

PRIORITY

This application is a National Stage Application of, and claims priority to, under 35 U.S.C. § 371, International Application No. PCT/GB2014/053447, filed 21 Nov. 2014, which claims the benefit of priority to Great Britain Patent Application Serial No. 1320584.4 filed 21 Nov. 2013, the priority benefit of which is also herein claimed, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technological Field

The present disclosure relates to a layered façade panel for supporting vegetation growing therein and to methods of manufacturing the same.

2. Description of Related Technology

The benefits of having vegetation growing on structures and buildings are numerous and include increasing urban biodiversity, improving health and wellbeing for urban citizens, reducing urban heat island effects, providing acoustic attenuation, providing thermal regulation, improving air quality by removal of pollutants, reducing $CO_2$ in the air and replacing it with oxygen, providing architectural/aesthetic benefits and providing habitats for plant/animal life in cities. An example of a system which aims to achieve these effects is described in WO 2011/086518. In this system, a porous ceramic material is used to support vegetation. However, porous ceramic materials are brittle. Thus, with the growth of vegetation through them, the porous ceramic layers may break and disintegrate over time.

Therefore, what is needed are methods and apparatus that address the foregoing deficiencies of the prior art.

SUMMARY

The present disclosure addresses the foregoing needs by providing for a layered façade panel for supporting vegetation growing therein and to methods of manufacturing the same.

In one aspect, a layered façade panel is disclosed. In one embodiment, the layered façade panel is secured to a building or structure, the panel comprising a porous metal outer layer, a non-porous backing layer and an intermediate layer between the outer and backing layers, the metal outer layer having a porosity for allowing vegetation to grow through the pores and to be supported in pores in the outer layer, and the intermediate layer being for supporting roots of said vegetation.

In another embodiment, a layered façade panel is secured to a building or structure, the panel comprising an outer layer, a non-porous backing layer and an intermediate layer between the outer and backing layers, the outer layer comprising metal foam having a porosity for allowing vegetation to be supported in pores in the outer layer, and the intermediate layer being for supporting roots of said vegetation.

In one variant, the porous metal outer layer may be metal foam, perforated metal plate, 3D printed metal, woven metal fabric or fine metal mesh. The metal may comprise aluminium. The outer layer is preferably a layer of metal foam. The metal foam may be open-cell metal foam. The pore sizes for the porous metal outer layer may be around 1 to 15 mm, preferably 2 to 8 mm.

In another embodiment, the layered façade panel is designed for the cultivation of vegetation primarily on the walls or sides of buildings or structures, for example on the exterior wall or an interior wall of a building. It can also be installed in a horizontal orientation, for example to cultivate vegetation on a roof, or in any orientation between horizontal and vertical.

In one variant, the panel can also be installed indoors with an artificial lighting system (which may be metered or permanently on) replacing or supplementing natural light to support plant growth. It may also be used in temporary applications (such as for construction hoarding panels or at festivals and expositions) or for visual and acoustic screening for building plant equipment such as transformers and air-handling units. The system can even support edible vegetation in the context of urban farming. The present disclosure provides a lightweight and thin overall panel, facilitated by the use of a porous metal outer layer, and preferably porous metal foam.

In another variant, the panel could also be used as a form of phytoremediation for the cleaning of waste water. Vegetation can be specifically chosen that is best suited for the cleaning of waste water. This waste water could be from the host building, nearby building, industrial facility or other. Recirculating the same waste water multiple times through the vegetation wall with or without dilution could reduce or eliminate toxic elements as well as at the same time providing the vegetation with nutrients.

In yet another variant, the porous metal outer layer is self-supporting, and provides structural support to the remainder of the panel. Whilst other self-supporting porous materials (such as porous ceramics) have been used in the field of vegetation-supporting façades, they do not provide this structural support, rather it is necessary to provide additional support, e.g. in the form of a concrete containing module or frame. Thus, in the present disclosure, no structural frame is necessary. Thus, it is preferred for the porous metal layer to have a combination of properties enabling it to be self-supporting whilst also allowing growth of vegetation through the pores. Metal foam provides an effective way to achieve this combination of properties. Due to the ductility of metal, in particular metal foam, this does not occur as plastic deformation is possible. The ductility of the metal outer layer further allows more than just the roots of the vegetation to be supported by the porous layer (i.e. more substantial parts of the vegetation, such as the stems). Likewise, a less brittle material such as metal enables easy removal of the layer without damage, for example for reseeding.

A further advantage of using a porous metal outer layer is that it can be weldable, with an appropriate selection of metals. For example, aluminium foams, perforated aluminium plates, 3D printed aluminium, woven aluminium fabric or fine aluminium mesh can be joined by welding. This can greatly ease the installation of the layered façade panel as metal rails or supports can be welded to the structural element of the layered façade panel. Different shapes and sizes of panels can be created during construction of a building, without any special equipment. Also, metal can be 100% recyclable. The ductility and workability of metal can allow for curved layered façade panels to be easily realized. Metal is also significantly more resistant to frosts than ceramic alternatives, thus extending the working life of the layered façade panel.

Porous metal layers, such as metal foam, perforated metal plate, 3D printed metal fabric or fine metal mesh, also has a high tensile capacity (much greater than that of porous ceramic materials) which prevents the outer layer being damaged by the growth of plants therethrough. In contrast, ceramics are relatively poor under tension. Growing plants are very strong and over time can break through all materials. Porous metal, such as metal foam, perforated metal plate, 3D printed metal fabric or fine metal mesh, has a greater resistance against this than porous ceramic materials. The proposed panel therefore has an increased lifespan compared to known ceramic panels.

Previously, in order to prevent porous ceramic layers from being damaged by the plants, the size of the pores had to be carefully limited so that only plants of a certain size can grow through the ceramic material. The ceramic material also limits the size of the plants growing through the façade. With the more forgiving and adaptable material properties of porous metal, such as metal foam perforated metal plate, 3D printed metal fabric or fine metal mesh, these limitations of ceramics are avoided. Further, the pore/opening size of the metal outer layer can be controlled in manufacturer to enable growth of different types of plants.

Porous metal, made of any suitable material may be used. For example the panel may comprise aluminium, copper, or steel, or other alloys. It will be understood that different metals provide different advantages and also different appearances, for example copper might be used for aesthetic reasons, whereas steel could suit a requirement for high strength.

The layered façade panel may also be abutted to metal façade of the same material (but without the vegetation support system) in order to provide visual continuity across a whole façade. The non-vegetation supporting elements may be backlit, or used as shading screens for example. The metal façade to which the layered façade panel may be abutted may be a visually identical porous metal façade.

In one variant, the density of the metal foam may be around $0.4$ g/cm$^3$.

In alternative variants, the metal is manufactured from aluminium, which is intended to refer to pure aluminium and aluminium alloys. For example, aluminium foam consisting of 6101 aluminium is readily available and suitable for use in the façade panel. Aluminium provides the various advantages set out above for porous metal materials along with additional advantages since aluminium is lightweight, corrosion resistant and relatively inexpensive. The corrosion resistance can be further improved through anodizing, painting techniques (applies to other metals as well as aluminium), or both.

Further, once the surface is coated, a metal has zero or minimal toxicity, thus having no negative impact on the growth of vegetation in terms of poisoning.

Aluminium is a commonly used material in the façade industry. Thus, a layered façade panel comprising porous aluminium, e.g. aluminium foam, layer can easily be connected to standard façade fittings and/or adjacent façades through standard fixing techniques, such as welding, bolting, clamping and so on. Further, standard coatings (such as colour coatings or protective coatings) can easily be applied to the layered façade panel.

In addition, the porous metal of the layered façade panel can easily be cleaned, for example by high pressure water hosing, and will not visually degrade over time.

The layered façade panel may be configured to have the surface of the outer layer oriented vertically, or horizontally, or at an incline intermediate the vertical and the horizontal. The panel may have a planar surface or a curved surface.

The porous metal may vary typically from 5 mm to 10 mm thick. The root layer could vary typically from 5 mm to 20 mm thick depending on the type of plants being grown. The impermeable backing layer could vary typically from 1 mm to 10 mm. The insulation layer could vary typically from 50 mm to 200 mm thick depending on the insulation requirements for the building. An advantage of the present layered façade panels over other systems, such as porous ceramic blocks, is that the thickness of panel is greatly reduced.

The total thickness of the layered façade panel may be around 2 cm excluding insulation layer.

The layered façade panel may be arranged to have dimensions, strength, weight and/or any other property similar to that of standard façade panels (i.e. those not configured to support vegetation) used in the façade industry. By aligning such properties, the layer façade panel may be handled and installed using standard techniques, thus requiring no new expertise of the workforce.

The intermediate layer may be a root mat comprising a fibrous fabric material, such as a fibrous horticultural felt, often referred to as a moisture retention mat, which typically has a density of between 300 g/m$^3$ to 900 g/m$^3$. Alternatively, the root mat may comprise rockwool. Such a layer may be referred to as a root mat layer. The root mat may be structurally supported by the porous metal outer layer or supported by the non-porous backing layer. The root mat layer provides a lightweight substrate in which water can be retained. It is less dense, for the same water retention properties, than conventional materials used as such a substrate (soil, for example). The root mat layer may comprise a plurality of layers of the root mat material.

The intermediate layer may be hydrophilic/absorbent so as to retain water within the layered façade panel. Porous metal, although porous, is not absorbent for water retention over extended periods of time. Although the porous metal does not retain water, being porous, it does not prevent water from passing through itself to the intermediate layer. Thus, if the panels are in an exterior situation, rain water that lands on the wall can permeate to the intermediate layer where it will be stored thus reducing significantly at times the amount of additional water required for irrigation. The porous metal layer has open pores allowing water to flow freely through its structure in all directions. The combination of the porous metal and the intermediate layer allows the free circulation of water between the two layers, although the nature of the intermediate layer will entrain water and air more effectively. Further, the backing layer may not be absorbent. Thus, substantially all of the water within the layered façade panel is held within the intermediate layer. Since the intermediate layer is separated from the ambient air, and possibly shielded from direct sunlight, by the porous metal layer, and may be insulated from the building/structure by the air gap layer and insulation layer, the layered façade panel may retain water effectively, thus reducing water and energy consumption of the system.

An additional film layer, e.g. plastic with pores for vegetation to penetrate, may also be included between the intermediate layer and the outer layer to further reduce evaporation, e.g. in warm environments. The film layer may be semi-permeable. This layer could be used for providing the seeds, rather than seeding the intermediate layer as mentioned below. The seeds could be glued or attached to this film layer and then placed in between the intermediate layer and external layer during panel manufacture before the panel is sealed up.

The intermediate layer may comprise an organic material and/or a non-biodegradable material. For example, the intermediate layer may be formed by an organic or inorganic fibrous material or a mix of both organic and inorganic materials. This could be in the form of soil or compost or a mixture of both as commonly found in gardens.

The intermediate layer may be non-biodegradable. This can lengthen the working life of the layered façade panel. The intermediate layer may be non-rippable felt, which may be made from recycled inorganic fabrics providing a highly resistant felt that is environmentally friendly.

The intermediate layer may be formed also by an organic material such as coconut fibres or other that may provide embedded nutrients to the vegetation. This organic material may come from waste matter such as coconut fibres or other organic matter. This intermediate layer may be formed by a mix of organic and inorganic materials, so that nutrients may be provided directly from this material without additional nutrients being provided. Additional nutrients could be added to this layer periodically or the organic intermediate layer could be replaced entirely every so often to ensure that the plants have sufficient nutrients.

The intermediate layer may be configured to be provided with seeds. This may occur during the production of the layered façade panel, such that the intermediate layer includes seeds after the panel is manufactured. Application may be via a horticultural glue, or embedded (woven or mixed) into the intermediate layer itself. By seeding on the intermediate layer during manufacture rather than on the external porous metal surface the panel will retain the pleasing visual integrity of the porous metal material after installation with the seeds being hidden from view.

The intermediate layer may be configured to be seeded and/or reseeded after production, for example on site during or after installation of the panel. Since seeds may be provided in the intermediate layer, and/or on the porous metal itself, and the pores in the porous metal are sufficiently large for plants to grow through the layered façade panel, it may be configured to support vegetation which is grown from seed in situ. This reduces the cost of the system, as no further steps (such as transplanting vegetation grown offsite) are required.

The layered façade panel may comprise multiple intermediate layers comprising alternating intermediate layer(s) and porous metal layer(s). In this case, the seeds may be provided in the intermediate layer adjacent the outer layer.

The backing layer may be configured to prevent roots from penetrating though to the building or structure. The backing layer may be a flexible or rigid barrier and may be configured to provide waterproofing to the building or structure against exterior conditions (e.g. precipitation) and/or water from an irrigation system of the layered façade panel. The panel is optionally intended to be incorporated in a façade with an irrigation system to provide water to the vegetation and this is discussed further below. The backing layer may be a rigid PVC layer. The backing layer may be structurally supported by the porous metal outer layer, or may be self-supporting, or may compositely —with the porous metal layer —provide rigidity to the panel.

The layered façade panel may further comprise an insulation layer. The insulation layer may be configured to be positioned between the backing layer and the building or structure. This insulation layer may form part of a modular layered façade panel for being fixed to the building or structure or may be an independent layer for being attached to the building or structure separately. The insulation layer may provide additional thermal and/or sound insulation for the building. The insulation properties of the layered façade panel may also be boosted by the vegetation on the outside of the metal outer layer and this effect will increase as the vegetation grows.

The layered façade panel may further comprise an air gap layer between the backing and the insulation layer.

Additionally or alternatively, the layered façade panel may comprise an additional waterproof layer, which may be configured to be positioned between the intermediate layer and the backing layer, or between the backing layer and the air gap layer, or between the backing layer and the insulating layer, or between the air gap layer and the insulating layer, or between the insulating layer and the building/structure. The additional waterproof layer may comprise EPDM rubber or concrete.

In another aspect, an irrigation system for use with the aforementioned layered façade panels is disclosed. In one embodiment, the layered façade panel may be arranged to be incorporated in a façade with an irrigation system to provide water to the vegetation. This can be part of an aquaponic or aeroponic system. This water may supplement water from precipitation, naturally and/or via a rainwater-harvesting system, or in arid regions it may be the sole source of water for the vegetation. In suitable climates, water vapour condensers could also be used to harvest water from the air. The panel may hence comprise an irrigation apparatus for supplying a liquid containing water and, optionally, nutrients to the layered façade panel. The water supply may also be aerated to ensure that plant roots do not rot.

When the irrigation apparatus is configured to supply water and nutrients, the layered façade panel may be for use in a hydroponic system. However, nutrients need not be supplied by the irrigation system, for example when the vegetation consists of epiphytes.

The irrigation apparatus may be gravity fed and hence may be designed to form part of a larger gravity fed irrigation system for multiple panels in a building façade. The façade panel may be provided with one or more fluid conduit(s), such as pipes that, when the façade panel is in use, direct water toward the roots of the vegetation, preferably by directing water toward the intermediate layer. The fluid conduit(s) may be pipes with a plurality of holes provided along the length of the pipe for allowing the liquid to pass from the pipe to the layered façade panel. Preferably the fluid conduit may be in contact with the intermediate layer, which may provide uniform distribution of the liquid throughout the intermediate layer. Further, the fluid conduit may be substantially entirely surrounded by the intermediate layer. The intermediate layer may be configured to provide capillary action so as to provide a uniform distribution of liquid throughout the intermediate layer. Such an irrigation system may be referred to as a drip system.

The fluid conduits may be configured to receive the liquid from a source, and may be configured to distribute the liquid along the top, the bottom or a height intermediate the top and bottom of the layered façade panel, when the panel is in use. The layered façade panel may be configured to allow the liquid to flow through the panel. The liquid may be collected and pumped back to the fluid conduit creating a closed loop. The liquid may be collected in one or more collection tanks, which would typically be provided as a part of the broader irrigation system for multiple panels rather than for each panel. The liquid may be pumped using one or more pumps, which once again would typically be provided as a part of the broader irrigation system for multiple panels in a building façade. This closed loop approach significantly reduces water consumption over conventional earth/traditional substrate systems.

The irrigation apparatus brings both water and also optionally nutrients to the plants/seeds. Initial irrigation of the intermediate layer may cause germination of the seeds that may grow from the intermediate layer through the porous metal layer to the sunlight. The liquid may be closely monitored to provide sufficient nutrients and water to the plants. The pH and the temperature of the irrigation liquid may be continuously monitored with reactive systems adjusting the nutrient level, pH and temperature for optimal plant growth. Irrigation may be closely monitored and adjusted according the moisture levels in the layered façade panel or root mat.

The intermediate layer may comprise one or more sensors to check moisture levels and irrigate as necessary. If the layered façade panel is on the exterior of a building/structure and there is precipitation on the layered façade panel, the irrigation system may be adjusted accordingly to provide only what is needed so as to not waste water.

The irrigation apparatus can be provided in different ways. For example, the layered façade panel may comprise one or more spray heads configured to spray liquid onto the external surface of the outer layer. Alternatively, irrigation may be provided by hand-spraying directly onto the outer layer, through a drip system as described above or with capillarity through the intermediate layer or a combination of all these methods.

The irrigation system may be connected to a rainwater harvesting system in order to reduce external water consumption. The rainwater harvesting system may be configured to collect water from the roof or other surfaces of the building/structure. The rainwater may be filtered, preferably before entering the irrigation system. Wind turbines, photovoltaic cells or other renewable local energy sources may be provided to power the one or more pumps.

For the provision of nutrients to the plants, the irrigation water may be dosed with nutrients according to the needs of the vegetation which the layered façade panel is configured to support. The nutrients provided could be imported on to the site of the building/structure, and/or biological digesters on the site could recycle organic waste produced on the site into nutrients.

When necessary, the intermediate layer may be flushed with water (i.e. the liquid containing no nutrients), preferably UV filter water. Such a step may reduce or prevent clogging of the intermediate layer. Such clogging may be caused by solidification of nutrients.

The outer layer may be removably mounted on the layered façade panel. Such a removable outer layer allows seeds to be sown directly into the intermediate layer and not through the outer layer as in known systems. Further, it may ease cleaning and maintenance of the layered façade panel. In addition, it allows the intermediate layer to be replaceable. This provides an alternative way to reseed the layered façade panel which may provide more control. The layered façade panel may also be reseeded by spraying seeds on to the outer layer of the layered façade panel. This may occur using hydroseeding methods or by painted application, both with the use of horticultural glue. This would act to significantly simplify reseeding and therefore maintenance costs.

Fixed cameras or mobile cameras with plant recognition software could also detect rogue species which could then be removed by operatives or drones.

The layers of the layered façade panel may be held together using one or more clamps or other fixing details, such as pins. The one or more clamps may be releasable to allow the outer layer to be demounted.

The layered façade panel 1, 101 comprises a perimeter edge 2A, 3A, 4A, 102A, 103A, 104A. The perimeter edge may comprise the perimeter edges of the layers of the layered façade panel (i.e. there may be no border/frame portion). No external casing or frame is needed to structurally rigidify the layered panel as this is provided by either the metal porous layer or the backing layer or compositely by both. Such a perimeter edge 2A, 3A, 4A, 102A, 103A, 104A may allow a plurality of layered façade panels (first 1, second 101) to be connected to one another to form a façade system 40 where the perimeter edges 2A, 3A, 102A, 103A of the outer layers 2, 102 and the intermediate layers 3, 103 of the adjacent layered façade panels 1, 101 may be adjacent to one another. The intention of not having borders between panels is such that plants can grow to the edges and roots can potentially share the intermediate layer of adjacent panels. The lack of border/frame also allows free movement, vertically and horizontally, of water across entire wall surfaces simplifying the irrigation system for the wall.

The non-porous backing layer 4 may be configured to interlock with a non-porous backing layer 104 of an adjacent layered façade panel 101. The non-porous backing layer 4, 104 may comprise a stepped portion 14, 114 at one edge. Preferably the stepped portion (14, 114) is the edge that forms the lower edge 14A, 114A when the panel is in use, and in such a case the stepped portion 14, 114 is stepped in an inward direction relative to the layered façade panel 1, 101. Alternatively, the stepped edge may be the edge that forms the upper edge when the panel is in use, and in such a case the stepped portion is stepped in an outward direction relative to the layered façade panel. The non-porous backing layer 4, 104 may comprise a protruding edge 15, 115 at one or two edges, preferably at an edge (upper edge 15A, 115A) opposite the stepped portion 14 114. The stepped portion may be on two edges to interlock with the protruding edge. The stepped portion 14 may comprise a step 16 which is approximately equal to the thickness of the non-porous layer 104. Such a backing layer 4 may allow for non-porous backing layers 104 of adjacent layered façade panels 101 to form a continuous non-porous layer, which may improve the performance of a façade system 40 comprising a plurality of the layered façade panels 1, 101. In particular, the positioning and direction of the stepped portion 14, and its subsequent interlock with the protruding portion 116, may improve the guiding and retention of vertically flowing liquid within the layered façade panels 1,101.

The layered façade panel may comprise a growth-preventing layer positioned between the intermediate layer and the outer layer. Such a layer does not allow the growth of vegetation therethrough. Such a layer may comprise a geotextile material. The growth-preventing layer may comprise cut-out areas. These cut-out areas may allow the growth vegetation from the intermediate layer through the outer layer. Thus the use of the growth-preventing layer and the cut-out areas may allow the amount and positioning of the vegetation on the outer surface of the layered façade panel to be controlled, for example for aesthetic or architectural reasons.

The layered façade panel may comprise a bracket. The bracket may be for attaching to an adjacent layered façade panel and/or the building/structure. The bracket may be attached to the non-porous backing layer. The bracket may be attached to the clamp. The bracket may be configured to provide a space between the layered façade panel and the building/structure. The insulation layer, the air gap layer and/or the additional waterproof layer may be provided within the space.

The layered façade panel can be configured to be mounted on to the building or structure using support rails fixed to the building structure or any standard technique. The bracket may be configured to be mechanically fixed to the support rails. Since using such rails is known for standard façade panels (i.e. façade panels without vegetation), such a mounting technique can ease mounting of the layered façade panel.

In another aspect, a façade system is also disclosed. In one embodiment, the façade system comprises a plurality of the previously-described layered façade panels, the plurality of layered faced panels positioned adjacent one another such that the peripheral edges of the respective layers of the layered façade panels are adjacent one another. Preferably the panel edges are in contact.

The irrigation fluid conduits of adjacent layered façade panels may be connected to one another, thus forming a continuous irrigation fluid conduit as a part of an irrigation system for the façade system. To prevent water loss an apron could be added at the perimeter edge of the plurality of layered façade panels and at openings in the plurality of layered façade panels for the likes of doors or windows.

The peripheral edges of adjacent layered façade panels may be held in position by brackets of the panels.

The insulation layer and/or additional waterproof layer of the façade system may have an area larger than that of individual layered façade panels. The insulation layer and/or additional waterproof layer may consist of one continuous layer. The continuous layer may have an area substantially equal to the area of the façade system. In such a case, the bracket(s) and/or rail(s) may extend through the insulating layer and/or the additional waterproof layer.

In another aspect, a method of constructing a layered façade panel is disclosed. In one embodiment, the method includes: providing an outer layer, a non-porous backing layer and an intermediate layer between the outer and backing layer, the outer layer comprising metal foam having a porosity for allowing vegetation to be supported in pores in the outer layer, and the intermediate layer being for supporting roots of said vegetation; and fixing the layers to one another.

BRIEF DESCRIPTION OF THE DRAWINGS

The features, objectives, and advantages of the disclosure will become more apparent from the detailed description set forth below when taken in conjunction with the drawings, wherein.

DETAILED DESCRIPTION

Reference is now made to the drawings wherein like numerals refer to like parts throughout.

Figure 1:
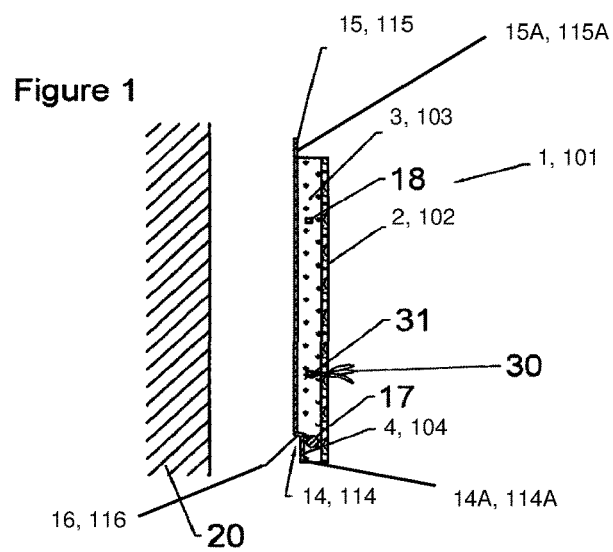
FIG. 1 is a side elevational view of a layered façade panel in accordance with the principles of the present disclosure.
Figure 2:
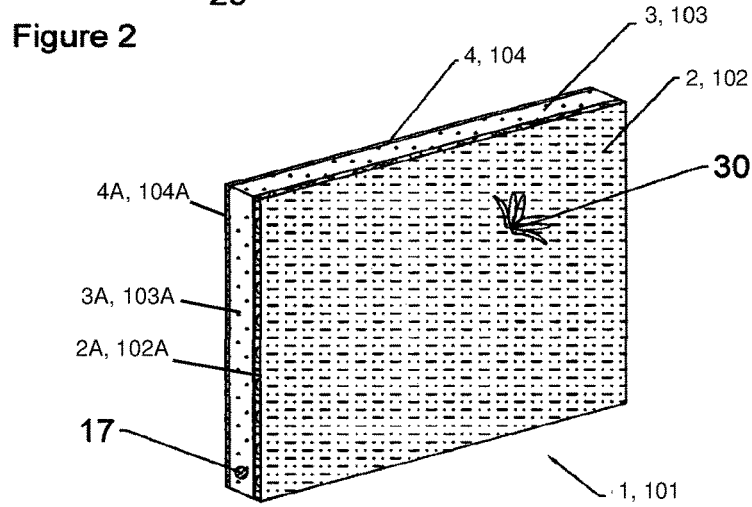
FIG. 2 is a perspective view of the layered façade panel of FIG. 1 in accordance with the principles of the present disclosure.

An embodiment of the layered façade panel 1 of the present disclosure is shown in FIGS. 1 and 2. The layered façade panel 1 is suitable for being secured to a building or structure 20 and comprises an outer layer 2, a non-porous backing layer 4 and an intermediate layer 3 between the outer layer 2 and backing layer 4. The outer layer 2 in this embodiment comprises aluminium foam having a porosity for allowing vegetation 30 to be supported in pores in the outer layer 2, and the intermediate layer is suitable for supporting roots 31 of said vegetation 30. The outer layer 2 is configured to be demountable from the layered façade panel 1.

As shown in FIGS. 1 and 2, the layered façade panel 1 is oriented vertically and has a planar surface.

The intermediate layer 3 is a root mat 3 comprising a fibrous fabric material. The root mat 3 is structurally supported by the aluminium foam outer layer 2. The root mat 3 provides a lightweight substrate in which water can be retained.

The root mat 3 is hydrophilic/absorbent so as to retain water within the layered façade panel. Aluminium foam, although porous, is not absorbent for water. Aluminium is impermeable and the foam layer 2 as a whole will not generally permit water retention over extended periods. Further, the backing layer 4 is not absorbent. Thus, when it is present, substantially all of the water within the layered façade panel 1 may be held within the root mat 3. The root mat 3 is non-biodegradable.

The root mat 3 may be provided with seeds—pre-seeded during manufacture. Thus, the layered façade panel 1 may support vegetation 30 which is grown from seed in situ.

The backing layer 4 prevents roots 31 from penetrating though to the building or structure 20. The backing layer 4 provides waterproofing to the building or structure 20 against exterior conditions (e.g. precipitation) and/or water from an irrigation system 42 of the layered façade panel 1. The backing layer 4 may also be structurally supported by the aluminium foam outer layer 2 or be self supporting or work compositely with the aluminium foam layer.

The non-porous backing layer 4 of the first layered façade panel 1 is configured to interlock with a non-porous backing layer 104 of an adjacent or second layered façade panel 101. The first non-porous backing layer 4 comprises a first stepped portion 14 at the first lower edge 14A of the panel 1. The first non-porous backing layer 4 further comprises a first protruding edge 15 at the first upper edge 15A of the panel 1. The first stepped portion 14 comprises a first step 16 which is approximately equal to the thickness of the non-porous layer 104 of the second layered façade panel 101.

The panel 1 also comprises a pipe 17 for supplying a liquid containing water and, optionally, nutrients to the layered façade panel 1. When the façade panel 1 is in use, the pipe 17 directs water toward the roots 31 of the vegetation 30. The pipe 17 may be provided with a plurality of holes provided along the length of the pipe 17 for allowing the liquid to pass from the pipe 17 to the layered façade panel 1. The pipe 17 is substantially entirely surrounded by the intermediate layer 3. The intermediate layer 3 may provide a capillary action so as to provide a uniform distribution of liquid throughout the intermediate layer.

The pipe 17 is configured to receive the liquid from a source, and is configured to distribute the liquid along the bottom of the layered façade panel 1, when the panel is in use. The layered façade panel 1 allows the liquid to flow through the panel.

The intermediate layer 3 comprises a sensor 18 to check moisture levels. The moisture levels may then be used to provide the necessary irrigation.

Figure 3:
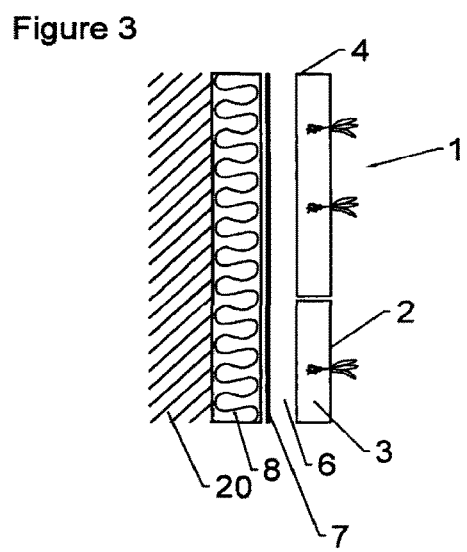
FIG. 3 is a side elevational view of another embodiment of a layered façade panel in accordance with the principles of the present disclosure.

Referring to the FIG. 3 embodiment, the layered façade panel 1 further comprises an insulation layer 8. The insulation layer 8 is positioned between the backing layer 4 and the building or structure 20.

The layered façade panel 1 of the FIG. 3 embodiment further comprises an air gap layer 6 between the backing 4 and the insulation 8 layer.

The layered façade panel 1 of the FIG. 3 embodiment also comprises an additional waterproof layer 7, which is positioned between the air gap layer 6 and the insulating layer 8. This waterproof layer 7 could also be placed between insulating layer 8 and the building or structure 20.

Figure 4:
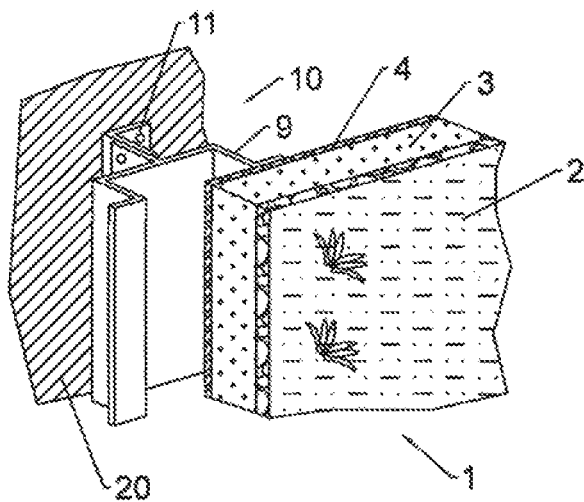
FIG. 4 is a perspective view of a layered façade panel with bracket in accordance with the principles of the present disclosure.

Referring to FIG. 4, the layered façade panel 1 comprises a bracket 9. The bracket 9 is used for attaching the layer façade panel 1 to an adjacent layered façade panel and the building/structure 20. The bracket 1 is attached to the non-porous backing layer 4. The bracket 9 provides a space 10 between the layered façade panel 1 and the building/structure 20 in which the insulation layer 8, the air gap layer 6 and/or the additional waterproof layer 7 may be provided.

The layered façade panel 1 is mounted on to the building or structure 20 using support rails 11 fixed to the building structure 20.

Figure 5:
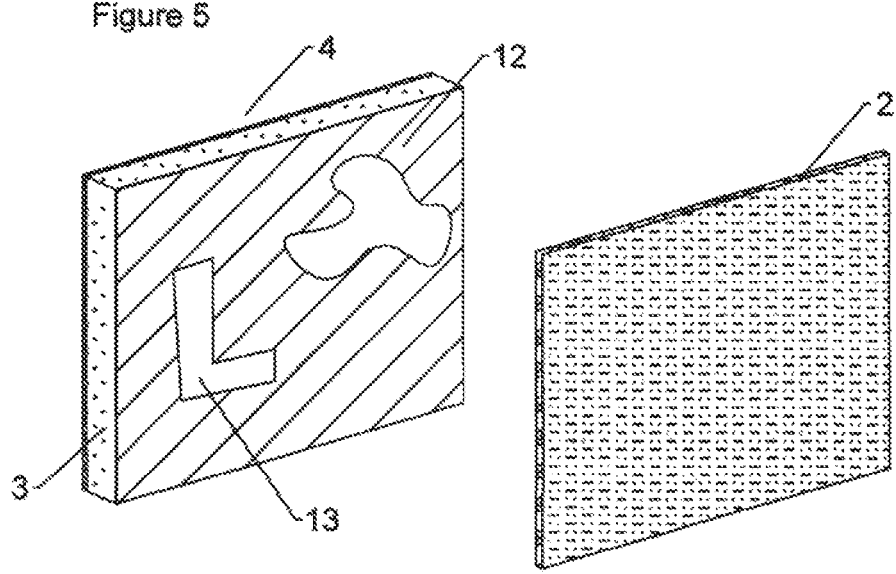
FIG. 5 is a perspective view of a layered façade panel having a growth-preventing layer in accordance with the principles of the present disclosure.

As shown in FIG. 5, the layered façade panel 1 comprises a growth-preventing layer 12 positioned between the root mat layer 3 and the outer layer 2. Such a layer 12 comprises a geotextile material and does not allow the growth of vegetation therethrough. The growth-preventing layer 12 comprises cut-out areas 13. These cut-out areas 13 allow the growth vegetation 30 from the intermediate layer 3 through the outer layer 2. Thus the use of the growth-preventing layer 12 and the cut-out areas 13 allows the amount and positioning of the vegetation 30 on the outer surface of the layered façade panel 1 to be controlled.

The layered façade panel 1 of all embodiments comprises a perimeter edge 2A, 3A, 4A, 102A, 103A, 104A. The perimeter edge 2A, 3A, 4A, 102A, 103A, 104A comprises the perimeter edges 2A, 3A, 4A, 102A, 103A, 104A of the layers 2, 3, 4, 102, 103, 104 of the layered façade panel (i.e. there is no border/frame portion). Such a perimeter edge 2A, 3A, 4A, 102A, 103A, 104A allows a plurality of layered façade panels 1, 101 to be connected to one another to form a façade system 40, as shown in FIGS. 6, 7 and 8, where the perimeter edges 2A, 3A, 102A, 103A of the outer layers 2, 102 and the intermediate layers 3, 103 of the adjacent layered façade panels 1, 101 are adjacent to one another.

Figure 6:
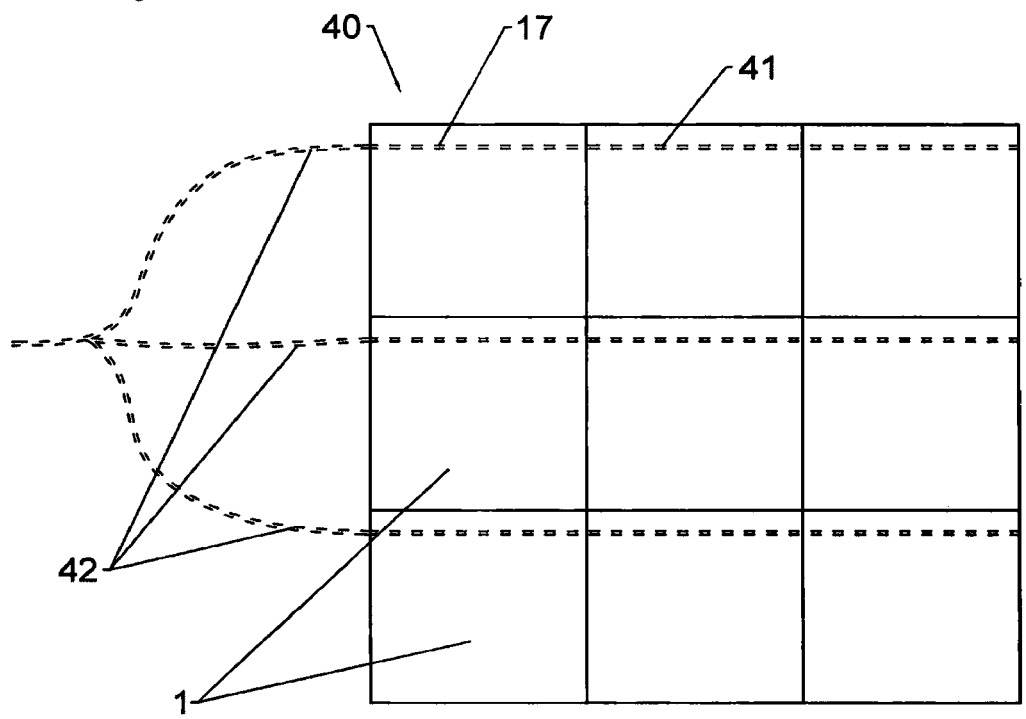
FIG. 6 is a front view of a façade system having a plurality of layered façade panels in accordance with the principles of the present disclosure.

Regarding FIG. 6, a façade system 40 comprising a plurality of the layered faced panels 1 is shown. The plurality of layered faced panels 1 are positioned adjacent one another such that the peripheral edges of the respective layers 2, 3, 4, 6, 7, 8, 12 of the layered façade panels 1 are in contact with one another.

The irrigation pipes 17 of adjacent layered façade panels 1 are connected to one another, thus forming a continuous irrigation pipe 41 as a part of an irrigation system 42 for the façade system 40.

Figure 7:
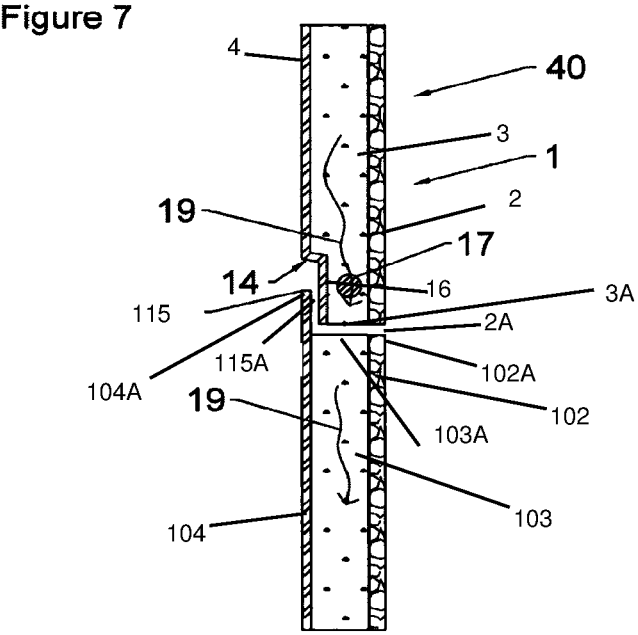
FIG. 7 is a cross-sectional view of two vertically adjacent layered façade panels in accordance with the principles of the present disclosure.

FIG. 7 show a cross-section of two vertically adjacent layered façade panels 1, 101 of a façade system 40 showing the interlock of the stepped portion 14 and the protruding portion 115 can be seen. Due to this interlock, effectively a continuous non-porous backing layer 4, 104 is formed. Further, due to the inward first step 16 of the first stepped portion 14, and its subsequent interlock with the second protruding portion 115, the performance of the backing layer 4, 104 is improved, particularly with regard to the guiding and retention of vertically flowing liquid 19.

Metal foam as in the embodiment described above is a preferred material for the metal layer. However, for some applications other porous metal materials could be used as a substitute. For example, the outer layer may comprise perforated metal plate, 3D printed metal, woven metal fabric or fine metal mesh.

The invention claimed is:

1. A façade system, comprising:
a first layered façade panel being comprised of a first metal outer layer having a first metal outer layer perimeter edge, a first backing layer having a first backing layer perimeter edge, and a first intermediate layer having a first intermediate layer perimeter edge, said first intermediate layer being between said first metal outer layer and said first backing layer,
wherein said first backing layer is further comprised of a first lower edge having a first stepped portion so as to form a first step and a first upper edge having a first protruding edge and being positioned opposite said first lower edge across said first backing layer; and
a second layered façade panel being comprised of a second metal outer layer having a second metal outer layer perimeter edge, a second backing layer having a second backing layer perimeter edge, and a second intermediate layer having a second intermediate layer perimeter edge, said second intermediate layer being between said second metal outer layer and said second backing layer,
wherein said second backing layer is further comprised of a second lower edge having a second stepped portion so as to form a second step and a second upper edge having a second protruding edge and being positioned opposite said second lower edge across said second backing layer,
wherein said first step is interlocked with said second protruding edge, said first step having a first step thickness compatible with a thickness of said second backing layer, and
wherein said first intermediate layer is in fluid connection with said second intermediate layer.

2. The façade system of claim 1, wherein said first metal outer layer comprises metal foam, perforated metal plate, 3D printed metal, woven metal fabric or fine metal mesh.

3. The façade system of claim 1, wherein said first metal outer layer comprises aluminum, steel or other alloys.

4. The façade system of claim 1, wherein said first metal outer layer is comprised of open-cell metal foam.

5. The façade system of claim 1, wherein said first intermediate layer is comprised of a fibrous fabric material.

6. The façade system of claim 1, wherein said first intermediate layer is hydrophilic/absorbent.

7. The façade system of claim 1, wherein at least one of a group consisting of said first metal outer layer, said first intermediate layer and said first backing layer is non-biodegradable.

8. The façade system of claim 1, wherein said first outer layer and said first backing layer are non-biodegradable, and wherein said first intermediate layer comprises at least one of a group consisting of an organic material and a non-biodegradable material.

9. The façade system of claim 1, further comprising: seeds in said first intermediate layer.

10. The façade system of claim 1, wherein said first layered façade panel further comprises a first insulation layer.

11. The façade system of claim 1, wherein said first layered façade panel further comprises a first waterproof layer positioned on said first intermediate layer opposite said first metal outer layer.

12. The façade system of claim 1, wherein said first layered façade panel further comprises a first irrigation apparatus.

13. The façade system of claim 12, wherein said first irrigation apparatus comprises a fluid conduit within said first layered façade panel so as to distribute irrigation liquid, said fluid conduit being in contact with said first intermediate layer.

14. The façade system of claim 1, wherein said first metal outer layer is removably mounted to said first layered façade panel.

15. The façade system of claim 1, wherein said first layered façade panel further comprises a first growth-preventing layer positioned between said first intermediate layer and said first metal outer layer.

16. The façade system of claim 1, further comprising a bracket attached to said first backing layer of said first layered façade panel.

17. The façade system of claim 1, wherein said first layered façade panel further comprises a first film layer disposed between said first intermediate layer and said first outer layer, said first film layer comprising pores.

18. A façade system, comprising:
    a first layered façade panel being comprised of a first metal outer layer having a first metal outer layer perimeter edge, a first backing layer having a first backing layer perimeter edge, and a first intermediate layer having a first intermediate layer perimeter edge, said first intermediate layer being between said first metal outer layer and said first backing layer,
    wherein said first backing layer is further comprised of a first upper edge having a first stepped portion so as to form a first step and a first lower edge having a first protruding edge and being positioned opposite said first upper edge across said first backing layer; and
        a second layered façade panel being comprised of a second metal outer layer having a second metal outer layer perimeter edge, a second backing layer having a second backing layer perimeter edge, and a second intermediate layer having a second intermediate layer perimeter edge, said second intermediate layer being between said second metal outer layer and said second backing layer,
    wherein said second backing layer is further comprised of a second upper edge having a second stepped portion so as to form a second step and a second lower edge having a second protruding edge and being positioned opposite said second upper edge across said second backing layer,
    wherein said first step is interlocked with said second protruding edge, said first step having a first step thickness compatible with a thickness of said second backing layer, and
    wherein said first intermediate layer is in fluid connection with said second intermediate layer.

* * * * *